Oct. 21, 1930.   G. A. PRITCHARD   1,778,771
LUGGAGE CARRIER FOR USE WITH MOTOR CAR DOORS
Filed July 27, 1928
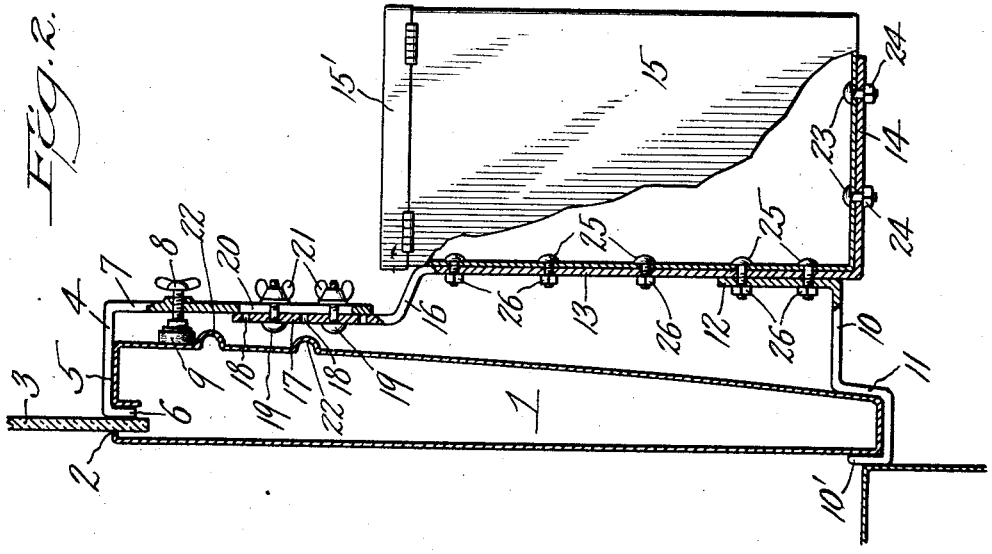
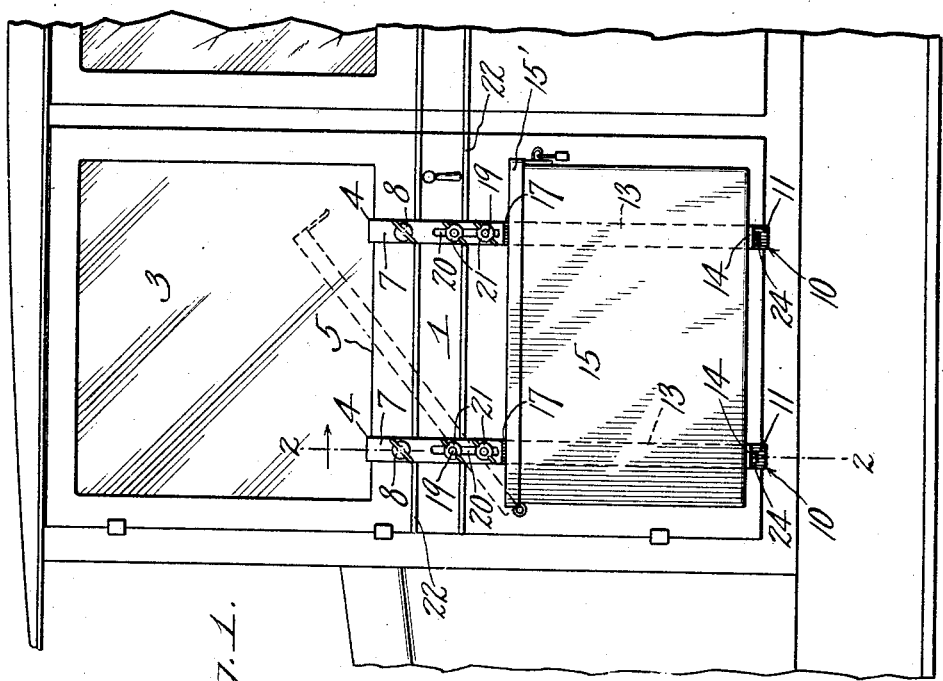

Patented Oct. 21, 1930

1,778,771

UNITED STATES PATENT OFFICE

GEORGE A. PRITCHARD, OF ATLANTIC BEACH, FLORIDA

LUGGAGE CARRIER FOR USE WITH MOTOR-CAR DOORS

Application filed July 27, 1928. Serial No. 295,709.

This invention relates to luggage carriers for use with motor cars and my improvements are particularly directed to the provision of trunk supporting means adapted for removable attachment to a door of a motor car in such manner that the door may be opened and closed while the supporting means, bearing the trunk, is attached thereto.

Various expedients have heretofore been devised whereby luggage may be supported on the running board of a motor car and connected to the side thereof, but with the means in use the door has not been free to open, causing inconvenience to the extent at least that the door is out of service. While in the nature of my invention it may be necessary to limit the weight of luggage carried to avoid imposing too heavy a load upon the door, ample carrying capacity may be provided by equipping all the doors of a motor car with similar carriers.

Other features and advantages of my invention will hereinafter appear.

In the drawing:

Figure 1 is a partial side elevation of a motor car, showing my improved luggage carrier attached to a door thereof, and Fig. 2 is an enlarged sectional view taken on the line 2—2 of Fig. 1.

In said figures let 1 indicate a motor car door, having the usual slot 2 in its window sill for the passage of the vertically movable glass 3.

The luggage supporting means devised by me and as illustrated herein consists of upper hangers adapted to engage the sill portion of the door, and lower brackets adapted to fit under the door bottom. The hangers and brackets are in vertically adjustable relation, whereby they may be fitted to doors of varying height.

The upper hangers, of which two are herein shown, each consists of an angled member having the arm 4 to lie horizontally across the window sill 5, said arm provided with a down turned finger 6 adapted to enter the slot 2, the other arm of said angled member lying vertically in spaced relation to the outer surface of the door. A winged screw 8 is threaded through the arm 7 and carries at its inner end a pad 9 of rubber or other cushion-like material, to bear against the door surface and allow the hanger to become clamped to the door upon tightening up the screw 8.

The lower brackets may each consist of an arm 10 extended across the door bottom and having an upturned finger 10' that engages the inner surface of the door. As here shown, the arm 10 has a vertical jog 11, providing with finger 10' a reception recess for the door bottom, though this formation is not essential. The lower brackets also each have a vertical arm 12, to which is bolted the vertical arm 13 of a trunk carrying bracket, whose horizontal arm 14 provides a supporting base for a trunk 15. Said arm 13 is angled at 16 toward the car door and continues upwardly in an extension 17 from said angled portion, in parallel relation with the arm 7 of an upper hanger.

The extension 17 is shown as provided with holes 18 adapted to receive bolts 19, and the arm 7 has a vertical slot 20, co-incident with holes 18, for the passage of the bolts.

The slot enables vertical adjustment to be effected between the upper hangers and lower brackets, and the winged nuts 21, engaging the bolts, permit the arms 7 and 13 to be secured in an adjusted position whereat the door is engaged both at its window sill and bottom.

The reason for providing a larger number of holes 18 than are used at one time is for the purpose of permitting the bolts 19 to escape contact with the beads 22 such as are found in different locations on the doors of cars produced by different makers.

The trunk 15, which may be of any suitable character, is shown as secured to the arm 14 of the carrying bracket by means of bolts 23 which are removably secured by nuts 24, so that the trunk can easily be released from the bracket. Similarly the trunk is removably secured to arm 13 of the bracket by bolts 25 having securing nuts 26, the lower bolts 25 also serving to connect bracket arm 13 to arm 12 of the lower bracket.

It will be observed that the tightening up of the respective threaded members 8 is all that is necessary to secure the engagement of the luggage carrier to the motor car door, and release thereof permits its removal.

The trunk is not intended to extend laterally beyond the width of the running board and its lid 15′ is shown as provided with hinges at one end, for convenience in opening the trunk.

Variations within the spirit and scope of my invention are equally comprehended by the foregoing disclosure.

I claim:

1. The combination with a motor car door of a luggage carrier composed of a hanger adapted to lie across the window sill of said door, a portion of said hanger depending outside said door, in spaced relation therewith, another portion thereof engaging the window slot, means carried by said depending portion bearing against the outer surface of said door to coact with said slot engaging portion in clamping the hanger to the door, and to hold said depending portion spaced from said door, a bracket adapted to engage the door bottom, connecting means between said hanger and bracket, and means for securing a trunk to said bracket and connecting means.

2. The combination with a motor car door of a luggage carrier composed of a hanger adapted to lie across the window sill of said door, a portion of said hanger depending outside said door, in spaced relation therewith, another portion thereof engaging the window slot, threaded means carried by said depending portion and having a terminal pad to bear against the outer surface of said door to coact with said slot engaging portion in clamping the hanger to the door, a bracket adapted to engage the door bottom, connecting means between said hanger and bracket, and means for securing a trunk to said bracket and connecting means.

3. The combination with a motor car door of a luggage carrier composed of a hanger adapted to lie across the window sill of said door, a portion of said hanger depending outside said door, in spaced relation therewith, another portion thereof engaging the window slot, means carried by said depending portion bearing against the outer surface of said door to coact with said slot engaging portion in clamping the hanger to the door, a bracket adapted to engage the door bottom, connecting means between said hanger and bracket, means of vertical adjustment between said hanger and connecting means, and means for securing a trunk to said bracket and connecting means.

4. The combination with a motor car door of a luggage carrier composed of a hanger adapted to lie across the window sill of said door, a portion of said hanger depending outside said door, in spaced relation therewith, another portion thereof engaging the window slot, means carried by said depending portion bearing against the outer surface of said door to coact with said slot engaging portion in clamping the hanger to the door, a bracket adapted to engage the door bottom, connecting means between said hanger and bracket, said connecting means having a horizontal arm to support a trunk, means for securing the trunk to said bracket and connecting means, and means for securing a trunk to said bracket and connecting means.

Signed at New York, in the county and State of New York, this 25th day of July, 1928.

GEORGE A. PRITCHARD.